AUTOMATIC TELEPHONE ANSWERING APPARATUS

Filed March 11, 1957

INVENTOR.
JOSEPH J. ZIMMERMANN
BY Andrus & Sceales
Attorneys 2,881,252
Patented Apr. 7, 1959

2,881,252

AUTOMATIC TELEPHONE ANSWERING APPARATUS

Joseph J. Zimmermann, Milwaukee, Wis., assignor to Electronic Secretary Industries, Inc., Milwaukee, Wis., a corporation of Wisconsin Application March 11, 1957, Serial No. 645,130

13 Claims. (Cl. 179—6)

Figures 1, 2:
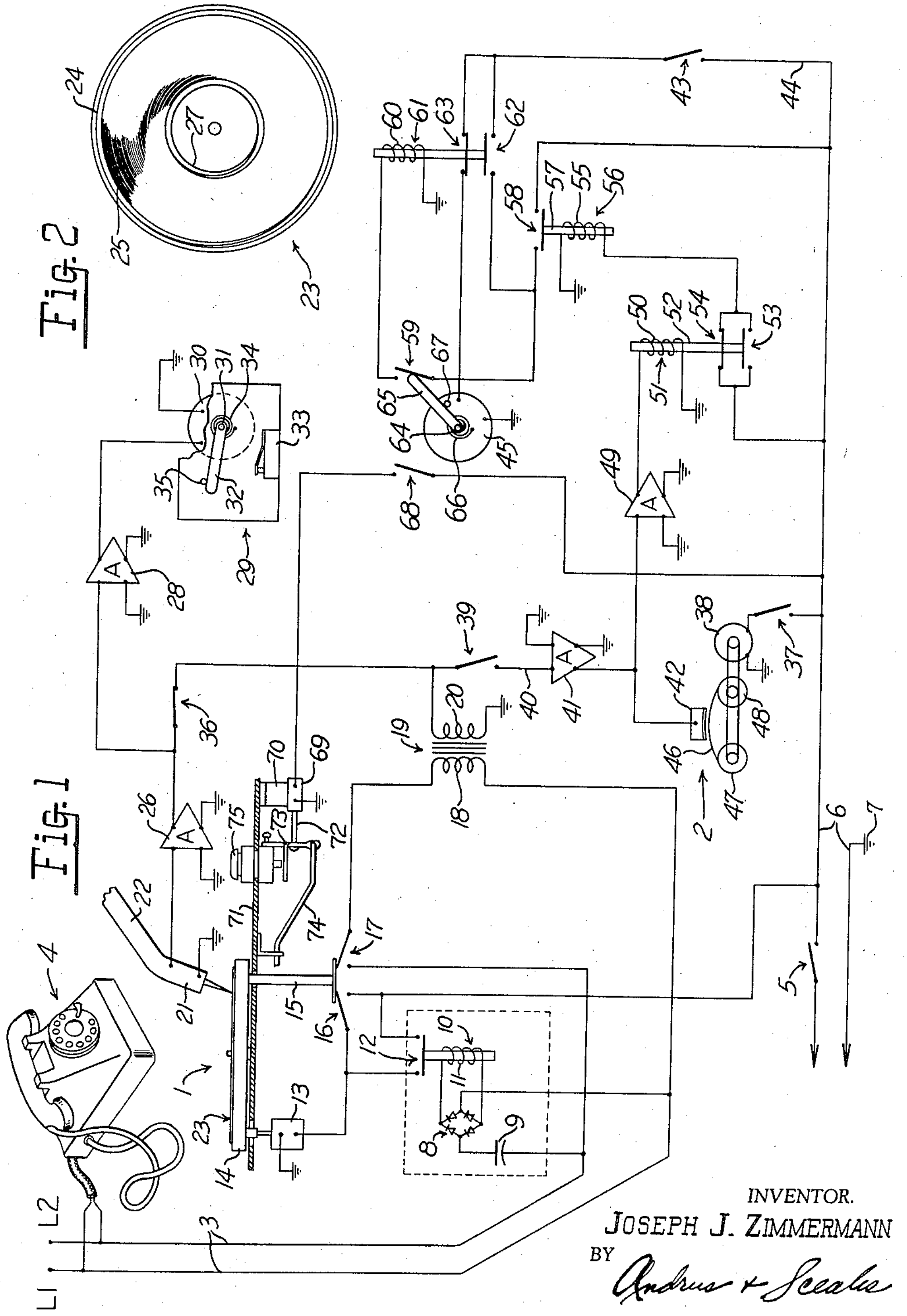

This invention relates to automatic telephone answering apparatus having an incoming message recorder and particularly to such apparatus wherein the incoming message recording operation is controlled by the calling party.

In one form of presently known automatic telephone answering apparatus, a predetermined cycle of operation is employed after which the calling party must again place a call if he wishes to give a further message. The predetermined cycle has the disadvantage of establishing an inflexible recording period.

Other apparatuses employ an indeterminate cycle with the incoming voice signals starting and maintaining the recording operation. If the calling party does not speak for a predetermined period, the answering device returns to standby. Similarly, if he hangs up, the device returns to standby.

However, in certain telephone systems, a dial tone is established in the telephone line circuit when the calling party hangs up and the called party is still connected to the line. In such a system the automatic voice controlled recorder of known devices is latched in to circuit and continues to operate until manually disconnected.

The present invention provides an automatic disconnect apparatus responsive to any steady electrical state or condition of conduction for a predetermined duration to reset the recorder device to standby. A positive drive means tends to disconnect the recorder from the telephone line. A change in the status of an incoming signal actuates the timing device to reset it to standby position. Therefore, if an incoming signal starts or stops within the predetermined disconnect period, the timing device will reset and start the timing period again. However, in the absence of this change in the state of an incoming signal, the device resets to standby.

The present invention provides calling party control for the recording cycle with a positive disconnection of the apparatus from the telephone line circuit if no incoming message is transmitted for a predetermined period.

The drawing illustrates the best mode presently contemplated of carrying out the present invention as described hereinafter.

In the drawing:

Fig. 1 is a schematic circuit of automatic telephone apparatus employing the present invention; and Fig. 2 is a plan view of an outgoing message record employed in the embodiment of Fig. 1.

Referring to the drawing and particularly to Fig. 1, a phonograph 1 and a recorder 2 are coupled to incoming telephone lines 3 to automatically answer an incoming telephone call to a telephone 4 shown as a conventional desk type variety. A main switch 5 is connected in a set of power supply lines 6 for the various components of the apparatus and permits disconnection of the phonograph and the recorder if the telephone subscriber is present and wishes to personally answer the phone.

The power supply lines 6 are connected to any suitable source of alternating current, not shown, such as the conventional 110 volt source. The one supply line is shown grounded as at 7. The various electrical components which are connected to the power supply lines 6 are shown as having one grounded terminal and another terminal connected to the other power supply line to complete their energizing circuits.

A full wave rectifier 8 is connected in series with a capacitor 9 across the telephone lines 3 to establish a triggering circuit responsive to ringing currents and to initiate actuation of the device as subsequently described. The capacitor 9 blocks the direct current normally circulating in the telephone line circuit from the rectifier 8. However, the capacitor 9 allows the intermittent ringing currents to pass. The rectifier 8 converts the ringing currents to a direct current which operates a triggering relay 10. The triggering relay 10 includes a winding 11 which is connected across the output of the rectifier 8. The winding 11 electromagnetically controls a set of normally open contacts 12 which are serially connected with a motor 13 for the phonograph 1. The incoming ringing currents energize the relay 10 to periodically close the contacts 12 and pulse the motor 13.

Each time the contacts 12 close, the motor 13 is energized and drives a turntable 14 of the phonograph 1 through a suitable turntable mechanism, not shown. The turntable mechanism may be of any suitable variety such as described in U.S. Patent No. 2,394,539, issued to J. Erwood on February 12, 1946.

A retractible pin 15, which constitutes part of a clutch device described in the referred to patent, is employed in the illustrated embodiment of the invention as a means for actuating two low pressure switches 16 and 17. The retractible pin is adapted to hold the switches 16 and 17 closed when the pin 15 is in a depressed position and to allow the switches to open when the retractible pin is in its normally elevated position. In this manner, the periodic closing of the triggering contacts 12, which actuates the phonograph motor 13 and thus the turntable mechanism, operates to eventually close the switches 16 and 17.

Switch 16 is connected in parallel with the triggering contacts 12 to bypass the triggering contacts and lock or latch the phonograph motor 13 to power supply lines 6. Consequently, once switch 16 closes, the phonograph motor 13 continues to drive the phonograph turntable 14 until the pin 15 is retracted, as hereinafter described.

Switch 17, which is also actuated by pin 15, is connected in a series circuit with a line winding 18 across the telephone lines 3. The winding 18 is one winding of a coupling transformer 19 and corresponds to the conventional load winding, not shown, of the telephone 4. A second winding 20 is magnetically coupled to the winding 18 and is connected to a phonograph pickup 21 through a tone arm 22.

The phonograph pickup 21 is adapted to traverse a record 23 and establish electrical signals in accordance with the sound recorded on the record 23. As shown in Fig. 2, the record is a conventional disk type having a continuous spiral sound groove starting with an initial lead-in groove 24. The length of the lead-in groove 24 is such that the period taken for the pickup 21 to traverse the groove 24 generally corresponds to the time delay to completely depress the pin 15 to actuate switches 16 and 17. Therefore, the pickup 21 does not reach an operating record zone 25 which contains an outgoing message until the switches 16 and 17 are closed. The zone 25 constitutes an outgoing message portion which is converted to a train of corresponding electrical signals. An amplifier 26 has its input connected to the tone arm 22 and its output connected to the winding 20 of transformer 19 to suitably amplify the signals for transmission via lines 3. The message is thus transmitted via the coupling transformer 19 to the telephone lines 3 and then to the calling party as the pickup 21 traverses the grooves in the message portion 25. The pickup 21 then enters an endless groove 27 which immediately follows the message portion 25. The groove 27 contains a continuous tone signal. This signal is also amplified by amplifier 26 and transmitted to the calling party via the transformer 19. The signal from the pickup 21 and amplifier 26 is also transmitted through an amplifier 28 to a timer switch 29. After a predetermined period of continuous energization, the timer switch 29 is adapted to operatively disconnect the phonograph 1 from the transformer 19 and to operatively connect the recorder 2 to the transformer 19.

The timer switch 29 includes a synchronous motor 30 which is connected a drive shaft 31 to a switch arm 32. The motor 30 is adapted to drive the arm 32 toward a bank of switches 33. A coil spring 34 encircles the drive shaft 31 with the one end of coil spring 34 connected to arm 32 and the opposite end connected to the motor 30. The coil spring 34 continuously biases the arm 32 to an initial starting position engaging a stop pin 35. Incoming intermittent signals to motor 30 from the pickup 21, momentarily drive the arm 32 toward switches 33. However, between the signals the coil spring 34 resets the arm 32 to its initial position engaging pin 35. Therefore, during the outgoing message portion on record 23, the arm 32 is never driven sufficiently far to actuate the switches 33. However, when the pickup 21 rides in the endless groove 27, the electrical signal which is established by the continuous tone, continues to actuate the motor 30 to drive the arm 32 and after a predetermined period the arm actuates the switches 33.

A first switch 36 of the bank of switches 33 is connected in the line which connects the output of amplifier 26 to the input transformer winding 20. This switch 36 is normally closed to allow the previously described transmission of the outgoing message portion 25 on record 23. When the switch 36 is actuated, it opens and eliminates further transmission of the continuous sound recorded on the record 23 and may be used as a signal to inform the calling party that he may now give an incoming message if he so wishes. Switch 36 is connected in circuit beyond the connection of the input of amplifier 28 to the output of amplifier 26. The electrical signal established by the groove 27 continues to energize the timer 29 after the switch 36 is opened.

A second switch 37 of switch bank 33 is serially connected with a drive motor 38 for the recorder 2 across A.C. supply lines 6. The switch 37 is normally open and prevents operation of the recorder 2 during the transmission of the outgoing message portion 25. When the bank of switches 33 is actuated by arm 32, the switch 37 closes and energizes the recorder motor 38.

A third switch 39 of switch bank 33 is connected in a line 40 which connects the winding 20 to the input of an amplifier 41. A recording head 42 of recorder 2 is connected to the output of the amplifier 41. When switch 39 closes, it operatively connects the recording head to the telephone lines 3 via the coupling transformer 19.

A fourth switch 43 of bank 32 is connected in a control line 44 which connects a disconnect motor 45 to the power supply lines 6. As hereinafter described, the disconnect motor 45 operates to return the automatic answering apparatus to standby if a message signal is not received from the calling party within a predetermined time period.

If a message is received, the recording head magnetically establishes the message upon a record 46. Record 46 is a wire or tape which is initially wound on a spool 47. The tape 46 is unwound from the initial record reel and wound upon another reel 48 and in so doing, passes the recording head 42. The spools 47 and 48 are coupled to recorder motor 38 and driven thereby when the switch 37 is closed, as previously described.

The incoming sound signals passing through the amplifier 41 are connected to the input of a triggering amplifier 49 as well as to the recording head 42. A relay winding 50 of a relay 51 is connected to the output of the triggering amplifier 49. The relay winding 50 actuates a common armature 52 controlling a first set of normally open contacts 53 and a second set of normally closed contacts 54. As long as winding 50 is de-energized, contacts 53 are open and contacts 54 are closed. As long as winding 50 is energized, contacts 53 are closed and contacts 54 are open. During a change in the energized state of winding 50, there is a momentary period when both sets of contacts 53 and 54 are open. The contacts 53 and 54 are connected in parallel in series with a winding 55 of a control relay 56 and each connects the winding 55 to the A.C. power supply line 6 in an independent energizing circuit.

An armature 57 of relay 56 is electromagnetically coupled to the relay winding 55 and controls a set of normally open contacts 58. The contacts 58 are connected in a series circuit with a motor actuated switch 59 and a relay winding 60 across the power lines 6. The relay 56 is of any suitable type having a faster closing action than the action of relay 51. Therefore, the contacts 58 close during the period that the state of contacts 53 and 54 change.

The relay winding 60 is the control winding of a double pole resetting relay 61 which includes two sets of contacts 62 and 63. Relay 61 is also a rapid acting relay such that the contacts are actuated before relay 56 opens its contacts 58.

The first set of contacts 62 is connected in parallel with the control contacts 58 and bypass the contacts 58. Therefore, relay 61 is maintained in an energized state after initial energization of winding 60 so long as the motor actuated switch 59 is closed.

The second set of contacts 63 are serially connected with the disconnect motors 45 and switch 43 across the power lines 6 to control the energization of the disconnect motor 45.

Motor 45 is preferably of a synchronous variety and is connected by a drive shaft 64 to a switch arm 65. The motor 45 is adapted to drive the arm 65 in a counterclockwise direction, as viewed in Fig. 1. A coil spring 66 encircles the motor drive shaft 64 and has one end connected to the arm 65 and the opposite end connected to the motor casing. The coil spring 66 biases the arm 65 to an initial position engaging a stop 67 which is secured to the motor casing. Whenever the motor 45 is de-energized, the coil spring 66 rapidly snaps the arm 65 back to stop 67. The arm 65 in its initial starting position engaging stop 67 holds the switch 59 open and breaks the circuit to the relay winding 60. Energization of the motor 45 drives the arm 65 away from switch 59 and toward a disconnect switch 68 mounted in spaced relation to stop 67.

Switch 68 is a normally open switch which is adapted to be closed by arm 65 after a predetermined period of operation of motor 45. The disconnect switch 68 is serially connected with a disconnect solenoid 69 across the power lines 6 to control energization of solenoid 69.

The solenoid 69 is mounted on a bracket 70 which depends from a phonograph turntable support 71. The solenoid 69 is adapted to reset the phonograph 1 to standby through a suitable reject mechanism, not shown. The reject mechanism may be of any suitable variety such as described in the previously referred U.S. Patent No. 2,394,539 to J. Erwood. An armature 72 of solenoid 69 is connected to a depending pivotal member 73 forming a part of the reject mechanism in the Erwood patent and which is supported by the support 71. A reciprocable reject rod 74 is secured to the free end of member 73 and is connected to the automatic reject mechanism, not shown. Energization of solenoid 69 actuates the reject rod 74 in the same manner as depressing a button 75 as shown in the Erwood patent. The reject mechanism is interconnected with the turntable mechanism, not shown, and simultaneously resets the tone arm 22 to an original starting position and retracts the depressed pin 15 to open the associated switches 16 and 17.

The operation of the illustrated embodiment of the invention is described as follows:

Assume the main control switch 5 is closed and an incoming call is received. The incoming ringing currents pulse triggering contacts 12 of relay 10. When the contacts 12 close, the motor 13 drives the turntable through a suitable turntable mechanism. Each time the motor 13 is driven, the pin 15 is depressed toward the switches 16 and 17. After several ringing periods the pin 15 engages and closes switches 16 and 17. Switch 16 bypasses the triggering contacts 12 and latches the phonograph motor 13 to the power line 6. The phonograph 1 then continues normal operation with the phonograph pickup 21 finally engaging the endless groove 27. The phonograph 1 continues to operate until the disconnect solenoid 69 is energized.

Switch 17 which is closed by pin 15 connects the coupling transformer winding 18 to the telephone line and permits transmission of the previously recorded message 25. The recorded message may be of any suitable information, such as informing the calling party that he is connected to an automatic answering device and that at the end of a subsequently given tone signal he may transmit any message he may desire and that it will be recorded.

After the pickup 21 traverses the outgoing message portion 25 and transmits the outgoing message, the pickup 21 engages the endless groove 27 and establishes a continuous electrical tone signal.

This signal is momentarily transmitted to the calling party to inform him that the apparatus is in condition for recording. This continuous signal also drives the timer switch 29 to actuate the switch bank 33 containing switches 36, 37, 39, and 43.

Switch 36 opens and disconnects the phonograph pickup 21 from the telephone lines 3 and discontinues the transmission of the tone signal.

Switch 37 closes and energizes motor 38 which then drives the record spools 47 and 48 to transfer the record 46 from the one reel to the other and past the recording head 42.

Switch 39 closes and connects the recording head 42 to the coupling transformer winding 20 and allows transmission of incoming message signals to the head 42 which establishes the signals on the record 46 in the form of time-spaced modulated magnetic areas or zones.

The fourth switch 43 in switch bank 33 closes and energizes the disconnect motor 45 through the following circuit: Supply line 6, line 44, switch 43, contacts 63 and motor 45 to ground. The motor 45 drives the arm 65 against the bias of spring 66 away from the stop 67. The arm then moves toward switch 68 and if the motor is not de-energized within a predetermined time period, switch 68 is closed and energizes the disconnect solenoid 69. If solenoid 69 is energized, it retracts the associated armature 72 and actuates the reject rod 74. A latch, not shown, is released by actuation of the reject rod 74 and the tone arm 22 is reset to an initial position adjacent the outer periphery of record 23, as set forth in the previously referred to patent of J. Erwood. Simultaneously with the movement of the tone arm 22, the pin 15 is elevated and the switches 16 and 17 open through the turntable mechanism, not shown. Switch 16 disconnects the motor 13 from the power line 6 and resets the phonograph 1 to standby. Switch 17 breaks the circuit connecting winding 18 across the telephone lines and returns the apparatus to standby.

However, if a message is transmitted within the timing cycle of disconnect motor 45, a portion of the signal passing through amplifier 41 as a train of electrical pulses is impressed via the amplifier 49 upon relay winding 50. The amplifier 49 further amplifies the incoming pulse signals to a level adapted to operatively energize winding 50. When winding 50 is energized, it actuates armature 52 to close contacts 53 and open the contacts 54. The relay winding 55 of relay 56 is normally energized through a circuit including the contacts 54. Therefore when relay winding 50 is energized, the winding 55 is energized through a circuit serially including the contacts 53. Winding 55 is consequently energized in the presence and in the absence of an energizing pulse signal impressed on winding 50. However, between the time a signal is impressed upon or removed from winding 50, there is a momentary period when neither of the contacts 53 or 54 are closed and winding 55 is de-energized. The relay contacts 58 then close and complete a circuit to the winding 60 if the switch 59 has closed. Switch 59 closes in response to the initial movement of arm 65 by motor 45. When the relay winding 60 is energized, the relay 61 is actuated to close the normally open contacts 62 and open normally closed contacts 63. The latch contacts 62 are connected in parallel with the contacts 58 and maintain winding 60 energized through the following circuit: Line 6, line 44, switch 43, contacts 62, motor actuated switch 59, and winding 60. The contacts 63 of relay 61 are serially connected with the disconnect motor 45 and when opened, de-energize the motor 45. With the motor 45 de-energized, the coil spring 66 rapidly resets the switch arm 65 to its initial position engaging stop 67. The switch arm then opens the switch 59 which breaks the resetting energizing circuit to winding 60. The reset relay 61 then returns to its normal position with relay contacts 62 open and relay contacts 63 closed. When relay contacts 63 close, the motor 45 is again energized to move the switch arm 65 toward disconnect switch 68. This begins another timing cycle.

Thus, each time the triggering relay 51 is energized or de-energized, a momentary period is established when neither of the associated contacts are closed. This results in de-energization of control relay 56 and closing of contacts 58. Each time the contacts 58 close, the motor 45 is reset, as previously described.

However, if the calling party fails to give a message for a predetermined period, the motor 45 drives the arm 65 to actuate switch 68 and reset the apparatus to standby period.

Similarly, if the calling party hangs up, and a dial tone is established in the telephone line circuit, the continuous tone actuates the relay 51 with a momentary break of contacts 53 and 54. Consequently, relay 56 is momentarily de-energized and the relay contacts 58 close to reset the motor 45. However, thereafter, the motor 45 will complete a disconnect cycle and reset the apparatus to standby. Consequently, the recording apparatus is not latched to the telephone line by the dial tone.

The various amplifiers are provided with suitable power supplies, not shown, which may be turned on in response to actuation of master switch 5 or automatically in response to some portion of the answering cycle.

Acoustical or inductive connections of the automatic apparatus can be employed as well as the illustrative conductive connections. Further, it may be connected directly to the telephone line as shown or connected through the telephone instrument as an intermediary.

The present invention provides a simple and positive means for control of an indeterminant cycle of recording for automatic telephone answering apparatus and similar apparatus.

Various modes of carrying out the invention are contemplated as being within the scope of the following claims particularly pointing out and distinctly claiming the subject matter which is regarded as the invention.

I claim:

1. Apparatus adapted to be connected through telephone lines to a remote signal transmitting station and to operate in response to intermittent incoming signals from said station, means responsive to an initial incoming triggering signal to start said apparatus, timing means adapted to disconnect the apparatus from the incoming signals and to reset the apparatus to standby after a predetermined period of timing means operation, and means responsive to subsequent intermittent incoming signals to reset the timing means to starting position prior to completion of its normal timing cycle whereby said apparatus continues to operate as long as at least one of said intermittent incoming signals begins or ceases within the predetermined period of timing means operation.

2. Apparatus adapted to be connected to a telephone line and to operate in response to intermittent incoming signals, means responsive to an initial incoming triggering signal to start said apparatus, timing means adapted to disconnect the apparatus from the incoming signals and to reset the apparatus to standby after a predetermined period of timing means operation, means responsive to predetermined operation of the apparatus to initiate operation of the timing means, and means responsive to subsequent intermittent incoming signals to reset the timing means to starting position prior to said predetermined period of timing means operation whereby said apparatus continues to operate as long as at least one of said subsequent intermittent incoming signals begins or ceases within the predetermined period of timing means operation.

3. Control means adapted to control operation of apparatus in response to signals received from a remote transmitting station, means responsive to a predetermined signal received from said remote station to begin a cycle of operation of the apparatus, means to latch said apparatus into operation independently of said incoming signal after a predetermined period of apparatus operation, timing means operatively associated with said apparatus and actuated in response to apparatus operation to start a disconnect cycle, said timing means being adapted to disconnect said apparatus and return the apparatus to standby after a predetermined period of timing means operation, an electrical conducting device operatively associated with said incoming signal and having its electrical conducting state momentarily changed in response to complete changes in the electrical state of an incoming signal, and electrical means responsive to a complete change in the conducting state of said electrical device to reset said timing means to an initial start position prior to completion of said predetermined period of timing means operation.

4. Telephone answering apparatus adapted to automatically answer an incoming telephone call and to record an incoming message of indeterminate length transmitted by the calling party over the telephone line system, which comprises recording means operatively associated with the telephone line system to record incoming messages, means responsive to an incoming ringing signal to latch said recording means to said telephone line system, resettable timing means operatively associated with the recording means to operatively disconnect the recording means from the telephone line system and reestablish standby operation after a predetermined period of continuous timing means operation, and means operatively associated with said timing means and responsive to a complete change in the electrical state of the incoming message signal to reset said timing means to starting condition prior to said predetermined period of timing means operation.

5. In an automatic telephone device adapted to be operatively associated with a telephone line system to automatically answering an incoming telephone call and to record an incoming message, a recording means adapted to be electrically connected to the telephone line system to record incoming messages, means responsive to a predetermined incoming ringing signal to initiate operation of said recording means, a holding circuit responsive to a predetermined incoming ringing signal to hold said recording means in circuit independently of said ringing signal, an electromagnetic timing means adapted to release the holding circuit and thereby disconnect the recording means from the telephone line system and return the recording means to standby, means biasing said timing means to an initial starting position, energization circuit means responsive to the starting of said recording means to energize the timing means and move said timing means against said biasing means from said initial position to a holding circuit release position, and means responsive to electrical discontinuities in the incoming message to momentarily break said energization circuit means and thereby permit said biasing means to reset the timing means to the initial starting position, said last named means returning the device to standby in the absence of a transmitted message for a time period corresponding to an uninterrupted cycle of the timing means.

6. In an automatic telephone answering apparatus having control means adapted to latch the apparatus in a cycle of indeterminate length in response to an incoming ringing signal, means to release said control means and return the apparatus to standby, timing means actuated in response to a predetermined period of operation of said apparatus and adapted to actuate said last named means after a predetermined period of continuous energization, a switch operatively connected to the telephone line in response to said same predetermined period of operation of said apparatus, said switch having in parallel circuit connection a first circuit position and a second circuit position alternately assumed in the presence and the absence of an incoming signal over said telephone line, said switch being serially connected with said timing means to a source of power through each of said switch positions, and means continuously biasing said timing means to an initial position and resetting said timing means during the momentary period during which the switch is changing from one circuit position to the other.

7. In an automatic telephone answering and recording device having a control means adapted to operatively latch the device to the telephone lines for an indeterminate cycle, electromagnetically operated means operatively associated with said control means to release said control means and allow said device to return to standby, electromagnetically operated timing means having a circuit actuating means biased to an initial position and moving to a circuit actuating position in response to predetermined period of energization, switch means responsive to a predetermined period of operation of the device to energize said timing means, an electromagnetic controller having contact means serially connected with said switch means and said timing means, electromagnetically operated circuiting actuating means movable between a first switch position and a second switch position connected in parallel circuit in series with said electromagnetic controller, said circuit actuating means being operatively connected with said telephone lines in response to said predetermined period of operation of the device and alternately assuming said first switch position in the presence of an incoming signal and said second switch position in the absence of an incoming signal whereby said electromagnetic controller is momentarily de-energized as said circuit actuating means moves from one switch position to the other and the timing means is momentarily de-energized and the associated circuit actuating means is reset to the initial position, and means responsive to the de-energization of said timing means to prevent energization of the timing means before said circuit actuating means is reset to its initial position.

8. In an automatic telephone answering and recording apparatus having an outgoing message reproducer latched in an indeterminate cycle in response to an incoming ringing signal and having a recorder subsequently latched into an indeterminate recording cycle by said reproducer, first electromagnetically operated means adapted to release said reproducer and to return the reproducer and the recorder to standby, a source of power, normally open switch means serially connected with said electromagnetic means across said source of power, second electromagnetic timing means having a driven member biased into spaced relation to said switch and adapted to close said switch after a predetermined operation of the timing means, a second switch means normally in an open circuit condition and actuated to a completed circuit condition by said reproducer in synchronism with the latching of said recorder into cycle, a third switch means normally in a closed circuit condition, an energization circuit for said timing means serially including said second switch means and said third switch means whereby said timing means is energized in response to the start of said recording cycle, third electromagnetic means controlling said third switch means, fourth electromagnetic means operatively connected to the telephone lines in response to the start of said recording cycle and having parallel connected circuit controlling means in series circuit with said third electromagnetic means and said source of power, said circuit controlling means alternately completing the circuit to said third electromagnetic means in response to the alternate presence and absence of an incoming signal and having a momentary period with both paralleled means in an open circuit condition to momentarily energize said third electromagnetic means, and means responsive to said momentary energization to prevent energization of said timing means until said driven member returns to its initial position.

9. In an automatic telephone answering and message recording device having a recording means operatively latched to a telephone line for an indeterminate recording cycle, electromagnetic means adapted to release said recording means and return the device to standby, an electromagnetic timer having a driven member adapted to move a predetermined distance and then actuate said first named electromagnetic means, means biasing said driven member to an initial starting position, switch means responsive to actuation of the recording means to connect the timer to a source of power, an electromagnetic circuit controller having a first set of contacts adapted to de-energize the timer and allow said driven member to move toward the starting position under the influence of said biasing means and having a second set of contacts adapted to latch said controller to a source of power, means responsive to the return of said driven member to its starting position to release said controller and re-energize said timer, an electromagnetic control means having a set of normally closed contacts adapted to initially energize said circuit controller, a second electromagnetic control means having a first closed switch means in the absence of energization and a second closed switch means in the presence of energization, said second control means momentarily having neither of said switching means closed as said state of energization changes, said switch means being parallel connected in series with said electromagnetic means and opening the associated contacts when either of said switch means is closed, and means operatively connecting second electromagnetic control means to said telephone lines to energize the second control means in response to the state of an incoming signal to alternately close said switch means and establish a momentary close circuit condition as said incoming signal stops and starts.

10. In an automatic telephone answering device adapted to be operatively connected to a telephone line system to automatically answer an incoming telephone call, a reproducer adapted to be associated with the telephone line system to transmit a previously recorded message thereover, means responsive to an incoming telephone signal to operatively connect the reproducer to the telephone line system, a holding circuit responsive to the initial operative connection of the reproducer to maintain said reproducer in operation independently of said telephone signals, a recorder adapted to be associated with the telephone line system to record an incoming message, means responsive to the completion of the outgoing message to operatively disconnect the reproducer from the telephone line and to operatively connect the recorder to the telephone line system, normally inactive timing means associated with said holding circuit and having an electromagnetic energizing means adapted to release the holding circuit after a predetermined period of uninterrupted energization, a timing means energizing circuit for said electromagnetic energizing means, said means responsive to the completion of the outgoing message being operative to complete said energizing circuit, electromagnetic means having parallel connected sets of contacts one of which is closed when the electromagnetic means is energized and another of which is closed when the electromagnetic means is de-energized, said electromagnetic means being connected to the telephone circuit in multiple with said recorder whereby the incoming signals control the state of the electromagnetic means, and electromagnetic means having control contacts connected in said timing means energizing circuit, an energization circuit connecting the last-named electromagnetic means in series-multiple with said contacts whereby said last-named electromagnetic means is energized in the presence and absence of an incoming signal, and said control contacts being connected to establish said timing means energizing circuit when said electromagnetic means is energized and to break said energizing circuit when said electromagnetic means is de-energized to allow said timing means to reset to an initial starting position.

11. In automatic telephone answering apparatus, an outgoing message record having an outgoing message on closely spaced spiral grooves and terminating in a tone signal in an endless groove, a phonograph adapted to support the record and having a pickup adapted to traverse said grooves and establish electrical signals corresponding to the sound code on said record, said pickup being associated with a telephone line system to transmit the outgoing message, electromagnetic motor means adapted to relatively move said record and said pickup, means connected to the telephone line and responsive to incoming ringing signals to actuate said motor means, a holding circuit adapted to maintain energization of said motor means and being completed in response to predetermined operation of said motor means, a recorder associated with the telephone line system and having a motor means adapted to relatively move a recording means and a record to record an incoming message, means operatively connected to the pickup and being responsive to the output of said endless groove to operatively disconnect the pickup from the telephone line system and to operatively connect the recording means thereto and to energize said recorder motor means whereby said recorder is adapted to record an incoming message for the subsequent duration of the phonograph motor operation, electrically operated timing means biased to an original circuit position and adapted after a predetermined period of energization to release said holding circuit and return the apparatus to standby, an energizing circuit for said timing means including a normally closed switch means in series with a normally open switch means actuated in response to said tone signal to energize said timing means, electromagnetic means controlling said normally closed switch means, an energizing circuit for said last-named electromagnetic means, said circuit including relay means actuated in response to incoming message signals, said relay means having a first set of contacts closed in the presence of a signal and opened in the absence of a signal and a second set of contacts opened in the presence of a signal and closed in the absence of a signal, and said contacts being parallel connected in said energizing circuit to momentarily open said energizing circuit each time an electrical signal begins or ceases to reset said timing means.

12. Telephone answering and message recording apparatus comprising in combination: message recording means; means responsive to ringing currents to connect said recording means to the telephone lines; timing means normally operative to disconnect said recording means from the telephone lines after a predetermined period of time; and means responsive to the presence of speech signals on the telephone lines for restarting said timing means before its normal time cycle is complete, said last mentioned means being unresponsive to either absence of signals or presence of a continuous signal on the telephone lines; whereby said apparatus will time itself out and reset to standby condition whenever the calling party hangs up his instrument or fails to deliver a message.

13. Telephone answering and message recording apparatus comprising in combination: playback means for answering an incoming call; means responsive to ringing currents on the telephone lines for energizing said playback apparatus and connecting it to the lines; message recording means; means operable automatically following completion of a cycle of said playback means for disconnecting said playback means from the lines and connecting said recording means to the lines; timing means normally operative to restore said apparatus to standby condition a predetermined period of time following connection of said recording means to the lines; and means responsive to the presence of speech signals on the lines for restarting said timing means before its normal time cycle is complete, said last mentioned means being unresponsive to absence of signals of the lines and presence of continuous signals on the lines, whereby said apparatus will time itself out and reset to standby condition whenever the calling party hangs up his instrument or fails to deliver a message.

References Cited in the file of this patent

UNITED STATES PATENTS 2,743,315 Van Deventer et al. ------- Apr. 24, 1956
2,793,252 Augustadt et al. ---------- May 21, 1957